United States Patent [19]

Prugh et al.

[11] Patent Number: 4,787,027
[45] Date of Patent: Nov. 22, 1988

[54] SYSTEM USING AN ADAPTER BOARD TO COUPLE A PERSONAL COMPUTER TO A PLURALITY OF PERIPHERALS IN A FINANCIAL ENVIRONMENT

[75] Inventors: William L. Prugh, Centerville; Tom R. Deaton, Carlisle; Henry G. Cooney, Kettering, all of Ohio

[73] Assignee: NCR Corporation, Dayton, Ohio

[21] Appl. No.: 778,578

[22] Filed: Sep. 20, 1985

[51] Int. Cl.[4] ............................................. G06F 13/10
[52] U.S. Cl. ....................................... 364/200; 380/24
[58] Field of Search ... 364/200 MS File, 900 MS File; 330/3, 4, 24, 29

[56] References Cited

U.S. PATENT DOCUMENTS

| 4,115,852 | 9/1978 | Rozell | 364/200 |
|---|---|---|---|
| 4,124,888 | 11/1978 | Washburn | 364/200 |
| 4,313,162 | 1/1982 | Baun et al. | 364/200 |
| 4,352,952 | 10/1982 | Boone et al. | 380/29 |
| 4,428,043 | 1/1984 | Catiller et al. | 364/200 |
| 4,456,957 | 6/1984 | Schieltz | 364/200 |
| 4,481,574 | 11/1984 | De Fino et al. | 364/200 |
| 4,484,263 | 11/1984 | Olson et al. | 364/200 |
| 4,485,439 | 11/1984 | Rothstein | 364/200 |
| 4,486,853 | 12/1984 | Parsons | 364/900 |
| 4,495,572 | 1/1985 | Bosen | 364/200 |
| 4,636,947 | 1/1987 | Ward | 235/379 |

OTHER PUBLICATIONS

MC 68120/68121 Intelligent Peripheral Controller, User's Manual, Motorola Inc. 1981.

Primary Examiner—Gareth D. Shaw
Assistant Examiner—Rebecca L. Adams
Attorney, Agent, or Firm—Wilbert Hawk, Jr.; Albert L. Sessler, Jr.; Elmer Wargo

[57] ABSTRACT

A financial system includes a plurality of peripherals like a magnetic stripe reader, printer, and keyboard which are coupled to a personal computer by an adapter board which is inserted into an interface bus within the computer. Even though the financial application being run may be single tasking, the system is capable of running multi-tasking operations. An encryptor/decryptor processor, which is used in handling secure data, is located on the adapter board to minimize unauthorized access to the secure data.

5 Claims, 5 Drawing Sheets

SYSTEM USING AN ADAPTER BOARD TO COUPLE A PERSONAL COMPUTER TO A PLURALITY OF PERIPHERALS IN A FINANCIAL ENVIRONMENT

BACKGROUND OF THE INVENTION

This invention relates to a system which enables a personal computer to be used in a financial environment which requires encryption/decryption of data and includes peripherals like a magnetic stripe reader, passbook printer, and keyboard, for example. The system includes a serial bus interface which provides the link between the serial-bus-based peripherals and the personal computer which contains financial application software to be run.

In recent years, there has been a trend to extend the use of personal computers to areas not normally thought of as typical uses for them. One of the problems with typical personal computer environments is that they are not capable of handling secure data in financial environments which require the use of peripherals of the type mentioned earlier herein. Also many of the personal computers as used do not provide for multi-tasking operations in a financial environment.

SUMMARY OF THE INVENTION

In contrast with the prior art systems mentioned, a preferred embodiment of the financial system made according to this invention comprises: a plurality of peripherals such as a printer, a magnetic stripe reader, and a keyboard; a personal computer having a financial application to be run, an interface bus for receiving adapter boards, and an adapter board operatively coupled to said interface bus; and a communication link for coupling said plurality of peripherals with said adapter board; said adapter board comprising: processing means for coupling said communication link with said personal computer to transfer data between said personal computer and said plurality of peripherals; said processing means including latch means for receiving data to be transferred in accordance with said financial application between said personal computer and said enable said financial system to processing means to run multi-tasking operations.

A feature of this invention is that an encryptor/decryptor which is used for handling secure data within the financial system is addressed as though it were one of the peripherals; however, the encryptor/decryptor is located on the adapter board where encryption/decryption activities are completely secure from "listening in" on external links.

Another feature of this invention is that it is capable of running software such as MS-DOS, which is "single tasking", in a "multi-tasking" environment.

Another feature is that the use of the adapter board isolates the application software from the physical hardware implementation by offering file oriented commands.

These features and other advantages will become more readily understood in connection with the following description, claims, and drawing.

DETAILED DESCRIPTION OF THE INVENTION

Figure 1:
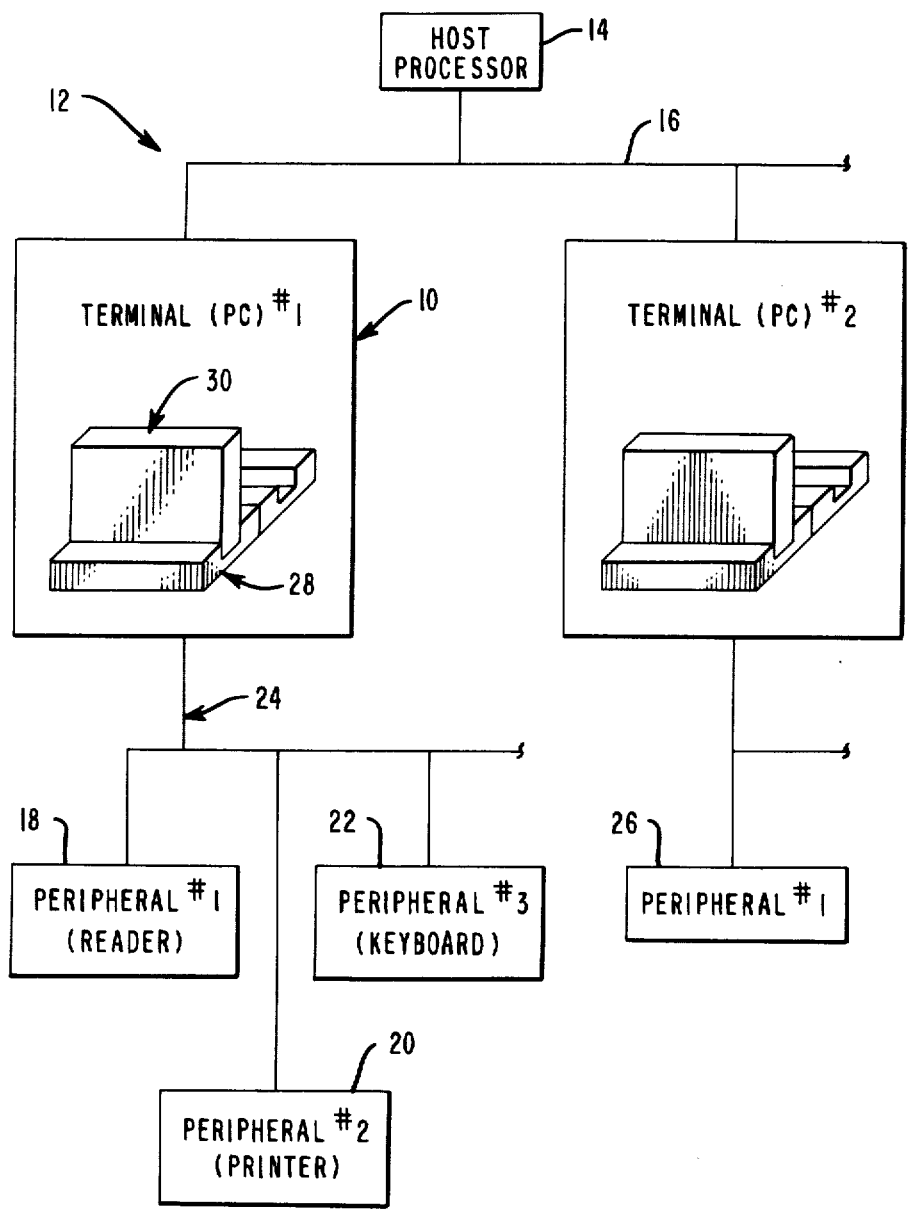
FIG. 1 is a general schematic and partly-pictorial diagram showing this invention as used in a financial processing environment.

As alluded to earlier herein, there is presently a trend to extend the use of personal computers to applications not commonly considered typical for them. In this regard, FIG. 1 shows a personal computer (PC) which has been modified to enable it to function as a financial terminal (designated as terminal #1 and given reference numeral 10) in a banking or financial system designated generally as 12.

The financial system 12 includes a host processor 14 which is coupled to the plurality of terminals #1, #2, and others (not shown) by a conventional communications network 16. Terminal #2 is identical to terminal #1; consequently, it is shown only in block form. Terminal #1 also referred to as 10 has a plurality of peripherals, like 18, 20, and 22 coupled to it through a communication line or an interface bus designated generally as bus 24. Correspondingly, terminal #2 has a plurality of peripherals associated with it, with only peripheral 26 being shown. The peripherals 18, 20 and 22 are conventional and may be respectively, a card reader for reading the magnetic stripe on an identification card, a printer for printing on passbooks and for providing receipts, and a keyboard for entering data. The terminal 10 has a conventional interface bus designated generally as 28 which enables plug-in, adapter boards to be inserted therein to modify the terminal 10 and make it more versatile. One such board, which is shown pictorially and designated generally as 30 in FIG. 1, is called the Standard Peripheral Interface Adapter board (hereinafter called SPIA board 30); this SPIA board 30 forms part of this invention.

Figure 2:
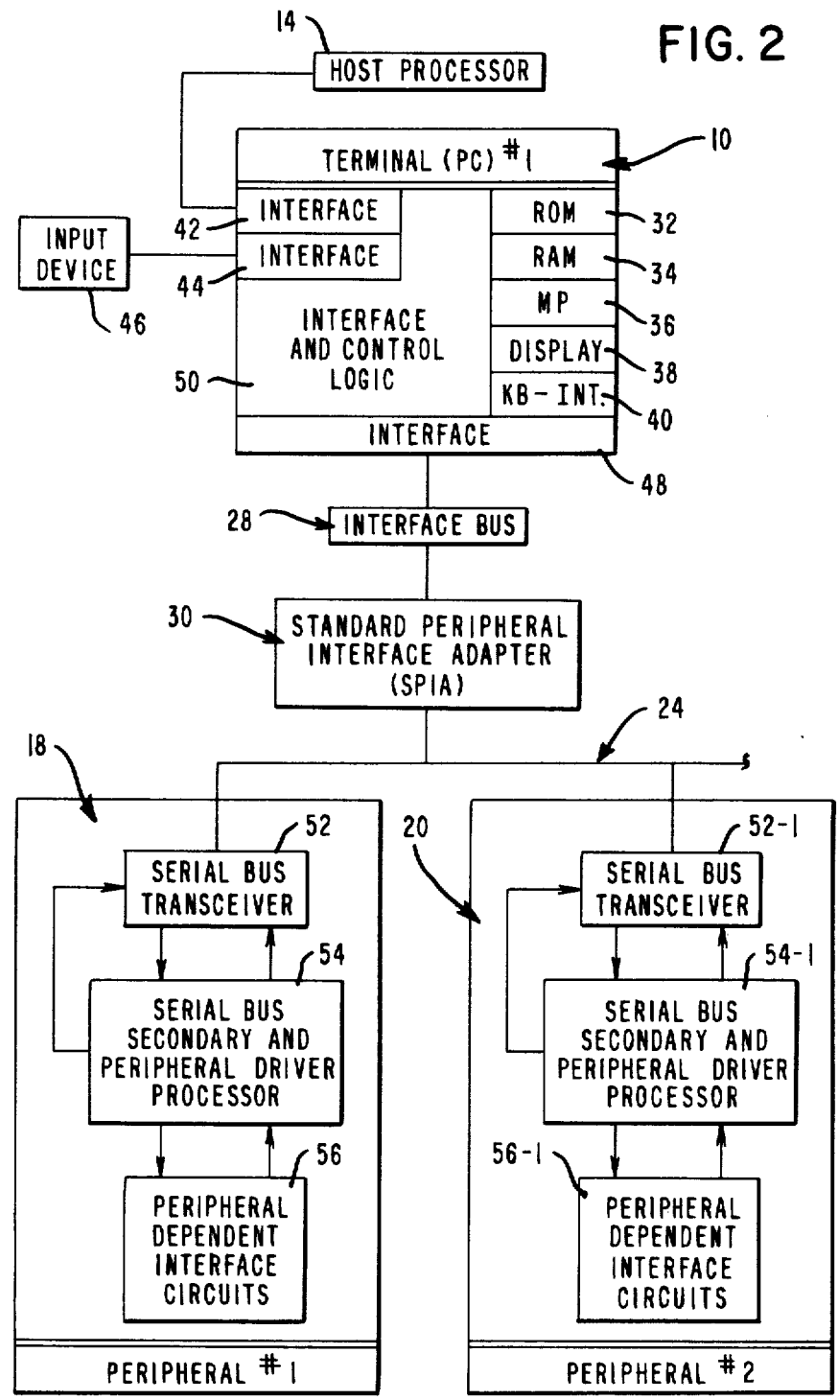
FIG. 2 is a schematic block diagram showing more details included in FIG. 1.

FIG. 2 shows additional details of the terminal 10 and the peripherals 18 and 20. The terminal 10 includes a read only memory (ROM) 32, a random access memory (RAM) 34, a microprocessor (MP) 36, a display 38, a keyboard interface (KB-INT.) 40 for receiving a keyboard (not shown) an interface 42 for coupling the terminal 10 to the host processor 14, an interface 44 for coupling the terminal 10 to an input device 46 (like a tape reader, for example), an interface 48 to couple the terminal 10 to the interface bus 28, and interface and control logic 50 which is used to couple, conventionally, the various elements mentioned to provide an intelligent terminal. The layout or diagram of the terminal 10 is shown to provide an understanding of its functions; however, the actual form or layout may be different from that shown.

The peripherals 18 and 20 shown in FIG. 2 are conventional peripherals which are associated with a financial environment and are included in financial system 12. The peripheral 18 includes a serial bus transceiver 52 which is coupled to the bus 24 and a serial bus secondary and peripheral driver processor 54, hereinafter called peripheral processor 54. The peripheral 18 also includes peripheral dependent circuits 56 which are unique to that peripheral. For example, peripheral 18 is a magnetic stripe reader which is used for reading magnetic identification cards. The circuits 56 are conventional and are designed to interface with the associated hardware (not shown) within the peripheral to read such identification cards. The peripheral 20 includes a serial bus transceiver 52-1 which is coupled to the bus 24 and a serial bus secondary and peripheral driver processor 54-1, hereinafter called peripheral processor 54-1. The peripheral 20 also includes peripheral dependent circuits 56-1 which are unique to that peripheral. For example, peripheral 20 is a printer which is used for printing on inserted forms or for printing receipts. The circuits 56-1 are designed to interface with the associated printing hardware (not shown). The peripherals 18 and 20, for example, are shown as being essentially identical even though they perform different functions. A feature of the financial system 10 is that the peripherals 18, 20 and 26, for example, are treated the same as far as message format and transfer of data are concerned. This enables different peripherals to be added to the system 10 without having to change the application software associated with the system 12; this aspect will be explained more thoroughly hereinafter.

Before proceeding with a discussion of the SPIA board 30, shown in FIG. 2, it appears appropriate to discuss, generally, the software associated with the system 10. In this regard, FIG. 3 is a schematic diagram showing, generally, the software relationship associated with the system 12 shown in FIG. 1.

As stated earlier herein, the terminal 10 has been modified to enable it to operate in a financial environment as shown by system 12. Accordingly, FIG. 3 shows a block 58 which includes financial application software which may be stored in the ROM 32 or RAM 34 of the terminal 10 as is conventionally done. Typically, the financial application software (block 58) is loaded daily into the RAM 34 of the terminal 10 from the host processor 14 (or from a magnetic disc, not shown) when the system 12 is to be used. The terminal 10 also has incorporated therein the standard MS-DOS which is a standard disc operating system which is shown as block 60. The software also includes a standard peripheral interface manager (block 62), a keyboard manager (block 64), and a printer manager (block 66); each of these managers may be stored in the RAM 34 of the terminal 10 and is coupled to a standard peripheral interface driver 68 which is a software driver. The interface driver 68 has the necessary interrupt service routines and the like (not shown) to provide the appropriate connections between the SPIA board 30 and the blocks 58, 60, 62, 64 and 66. The software included in blocks 58 and 60 is considered conventional industry standard software, and the software in blocks 62, 64, 66 and 68 is considered unique operating software for the terminal 10.

Figure 3:
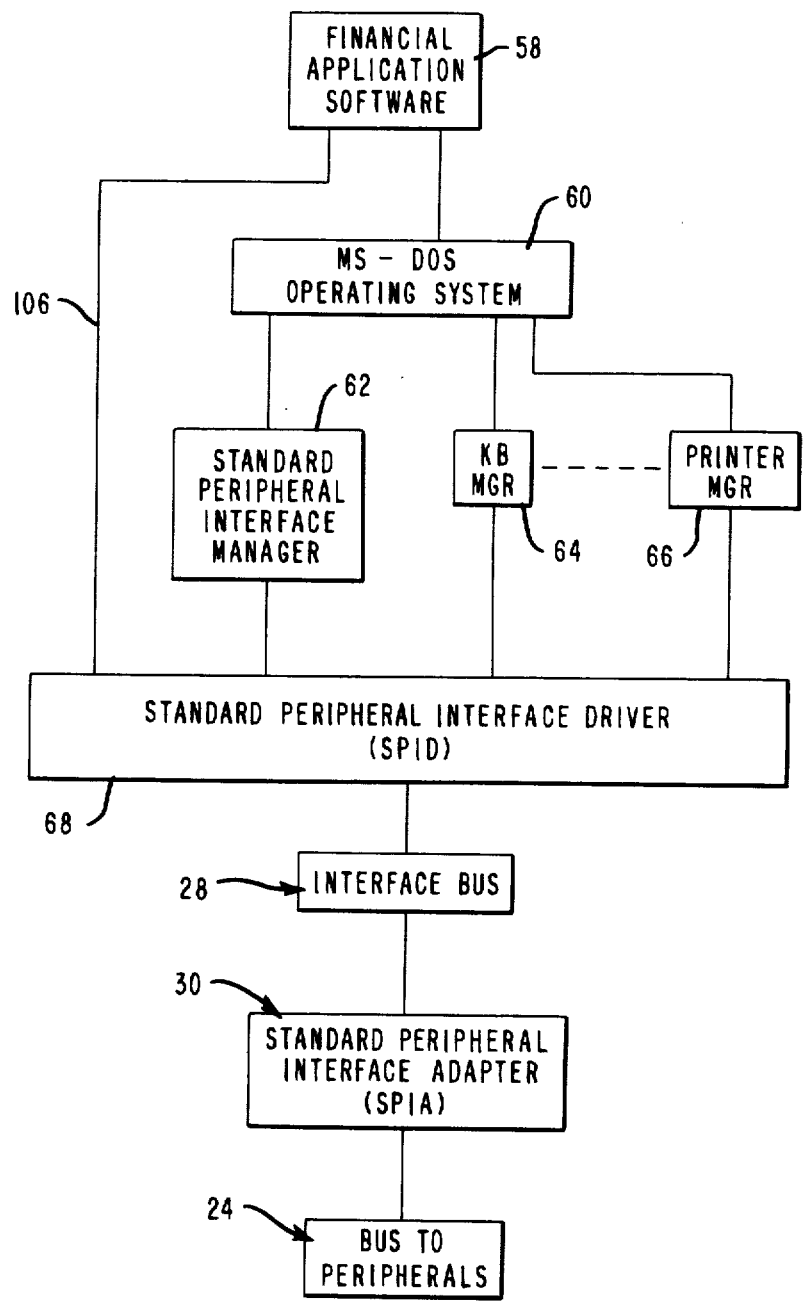
FIG. 3 is a schematic diagram showing, generally, the software relationship associated with the environment shown in FIG. 1.

The standard peripheral interface manager (block 62) is the layer of software closest to the application software (block 58) and serves as an interface between the application software (block 58) and the interface driver 68 (FIG. 3). The interface manager (block 62) also is a conventional MS-DOS installable device driver which allows the various languages like Pascal, Basic, etc. to accommodate programs written in these languages as is typically done. The interface driver 68 is a re-entrant, interrupt-driven module which is invoked via software interrupts and which controls the SPIA board 30 by sending and receiving commands and responses to and from the peripherals like 18 and 20, for example.

The keyboard manager (block 64) filters keyboard functions normally handled between Basic Disc Operating System (BDOS) and the Basic Input Output System (BIOS) and is a desirable feature for the terminal 10 when used in a financial environment like system 12. The keyboard manager (block 64) interfaces the application software (block 58) via BDOS to the keyboard (like peripheral 22 in FIG. 1) by polling the keyboard through the interface driver 68 and by intercepting the normal BIOS keyboard functions. This operation is completely transparent to the application software (block 58). This will be described in more detail hereinafter.

Figure 4:
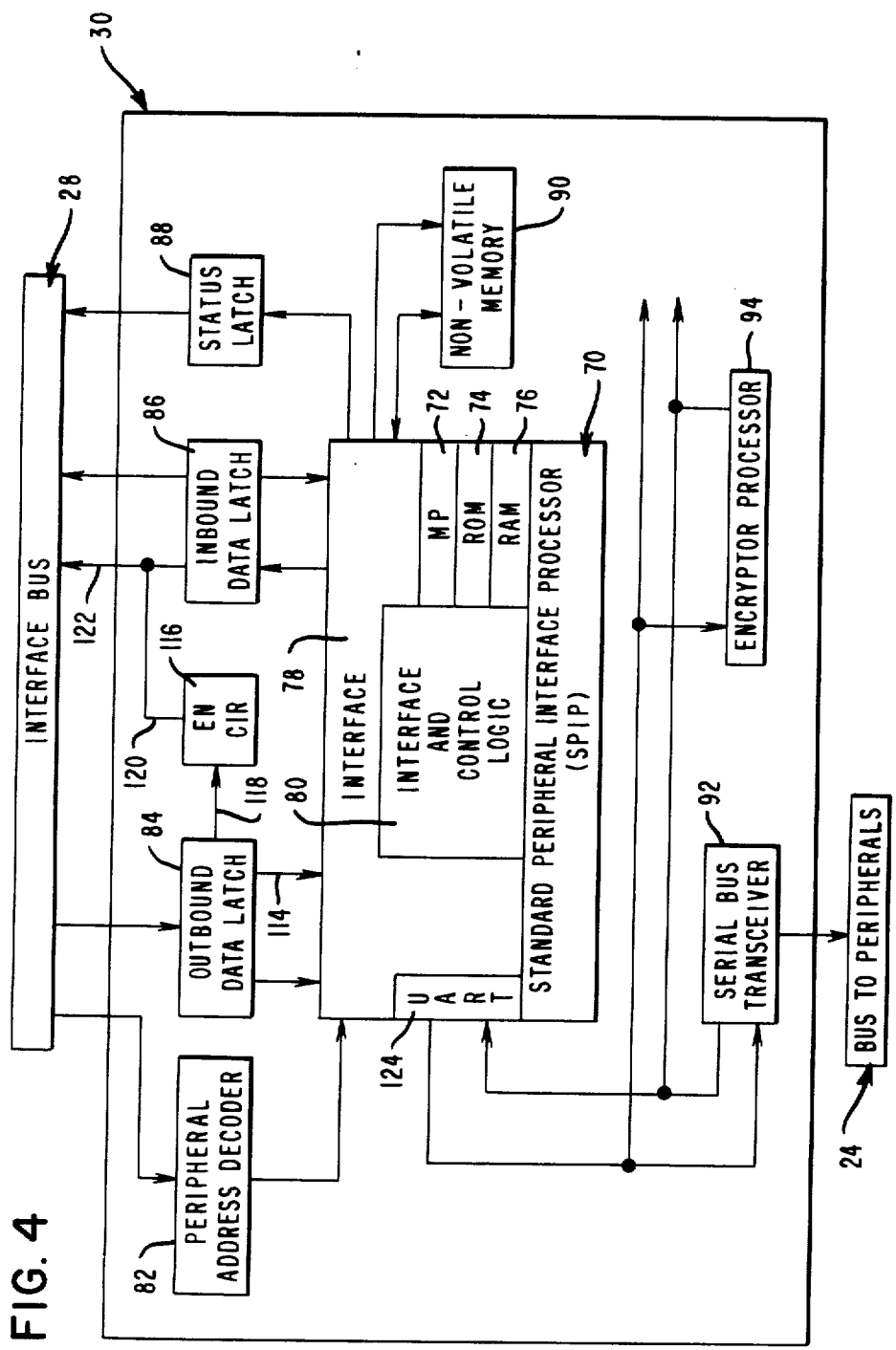
FIG. 4 is a schematic block diagram showing more details of the standard peripheral interface adaptor shown in FIG. 2.

FIG. 4 is a schematic block diagram of the SPIA board 30 shown in FIGS. 1-3. The SPIA board 30 includes a standard peripheral interface processor (SPIP) which is designated generally as 70. The SPIP 70 includes a processor like a microprocessor (MP) 72, ROM 74, RAM 76, an interface 78 for coupling the SPIP 70 to outside elements or UART 124, and interface and control logic 80 to couple together the various elements mentioned so as to enable the SPIP 70 to operate as an intelligent device.

The SPIA board 30 (FIG. 4) also includes a peripheral address decoder 82 which is coupled to the interface bus 28. The decoder 82 (in the embodiment described) is used to select the SPIA board 30 which is one board of several boards (not shown) which may be installed in the interface bus 28 (FIG. 1). The SPIA board 30 also includes: an outbound data latch 84 for storing data sent from the terminal 10 over the interface bus 28; an inbound data latch 86 for storing data to be sent from the SPIA board 30 to the terminal 10; and a status latch 88 to be used in the "handshaking" activities between the terminal 10 and the SPIA board 30. The latches 84, 86, and 88 are single byte latches in the embodiment described. The SPIA board 30 also includes a conventional non-volatile memory 90 for storing financial transaction totals in the event of a power disturbance during processing, a serial bus transceiver 92, and an encryptor processor 94.

In a prior art financial system, the encryptor processor included therein was located with the peripherals and was addressed via an external link by the associated processor. This meant that encrypted data and the corresponding decrypted data passed over the external link, making the system vulnerable to compromising by someone who tapped into the external link.

In contrast with this prior art system, the encryptor processor 94 of system 12 is located on the SPIA board 30 as previously mentioned. This means that encrypted and decrypted data do not pass over the bus 24 where someone tapping into the bus 24 can use the encrypted and decrypted data to figure out the encryption scheme being used in the system 10. This is a feature of this invention.

Another feature is that the encryptor processor 94 (FIG. 4) which is located on the SPIA board 30 is addressed as though it were one of the peripherals 18, 20, or 22. As a general example, if data which is considered to be secure data is to be printed by the peripheral 20, the financial application software (block 58 in FIG. 3) which is being run on the terminal 10, will address the encryptor processor 94 to receive the encrypted data. During the time that the encrypted data is being sent to the encryptor processor 94, the interface processor 70 (FIG. 4) will cause the serial bus transceiver 92 to disconnect the SPIA board 30 from the bus 24. This means that encrypted data does not go out on bus 24 to the peripherals 18, 20, and 22. After the encryptor processor 94 decrypts the encrypted data sent to it, the resulting clear text data passes through the interface 78 of the interface processor 70 and is placed in the inbound data latch 86 until the financial application software (block 58) requests it to be sent to the terminal 10. Thereafter, this software (block 58) addresses the peripheral 20 and sends the clear text data over the bus 24 to the peripheral 20 where the clear text data is printed. Notice that the encryptor processor 94 is addressed as a peripheral; however, during the time that encryption and decryption take place, the bus 24 to the peripherals 18, 20 and 22 is disconnected from the SPIA board 30. A point to be made here is that not all the data passing between the terminal 10 and the peripherals 18, 20 and 22 needs to be decrypted or encrypted. When clear text data is to be transferred from the terminal 10 to the peripheral 20, for example, the financial application software (block 58) transfers it directly to the peripheral 20 without being routed to the encryptor processor 94. In the embodiment described, the encryptor processor 94 is conventional and employs the standard NBS/DES encryption.

Having described generally the hardware and software used in the financial system 12, it appears appropriate to discuss in detail how messages are sent to and from the terminal 10. A message going from the terminal 10 to one of the peripherals, for example, is defined as a command message. A message coming from the peripherals in response to a command message is defined a a response message.

A point to be made here is that all the peripherals, like 18 for example, are accessed by the terminal 10 as though they were files using a file-oriented, command structure. These commands allow a single, logical interface (SPIA board 30) to all the peripherals (18, 20, 22) from an application (block These commands and the associated codes include the following shown in Table 1:

TABLE 1

| Code | Command |
|---|---|
| 00000 = | Reset |
| 00001 = | Read Status |
| 00010 = | Open |
| 00011 = | Close |
| 00100 = | Read Tallies |
| 00101 = | Read & Clear Tallies |
| 00110 = | Read next |
| 00111 = | Write next |
| 01010 = | Echo |
| 01011 = | Delete record |
| 01100 = | Read random record |
| 01101 = | Write random record |
| 01110 = | Read device control memory |
| 01111 = | Write device control memory |
| 10000 = | Create file |
| 10001 = | Delete file |

Figure 5:
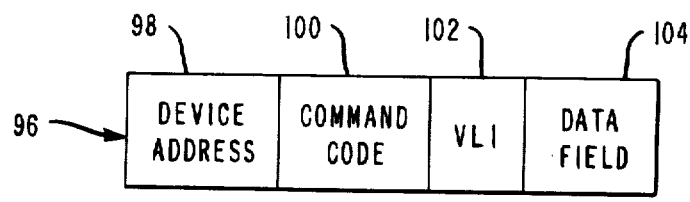
FIG. 5 is a schematic diagram showing a command message format in this invention.

A message format as used herein is shown in FIG. 5 and is designated generally as 96. The message format 96 includes a device address 98, which in the embodiment described, is a byte wide and indicates the peripheral, like 18, to which the message is addressed. The command code 100 is one byte wide and includes the five binary bits shown in Table 1. The entire command code has the following eight-bit format;

ofmCCCCC;

wherein:

0 = not used f = Message Format in which:
　0 = no data present
　1 = VLI (variable length indicator) data present.

m = Message Segment Flag in which:
　0 = last segment
　1 = another segment follows C = Command, wherein the five binary
bits of the code associated with a specific command are shown in Table 1.

The variable length indicator (VLI) 102 (FIG. 6) is an eight bit byte which indicates the length of the particular message being sent. In the embodiment described, the data field 104 is up to 128 bytes wide. When data is sent, the VLI 102 indicates the length of the associated data field 104.

As previously stated, the command messages are sent from the terminal 10 to the peripherals 18, 20, and 22, for example. One route from the application software (block 58 in FIG. 3) of the terminal 10 is through the MS DOS operating system 60, through the interface manager (block 62 in FIG. 3), and through the interface driver 68. Another route is from the application software (block 58) directly to the interface driver 68 by the path 106 shown in FIG. 3. The particular route of the two routes mentioned which is used to transmit a command message (format 96) to the interface driver 68 is determined by the financial application software (block 58).

Figure 6:
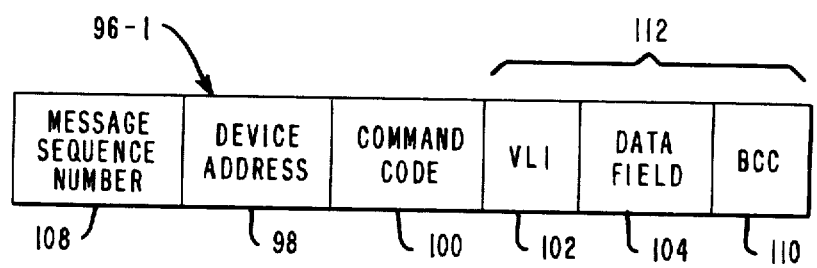
FIG. 6 is a schematic diagram showing the command message format at a different stage of processing compared to that shown in FIG. 5.

When a command message arrives at the interface driver 68 (FIG. 3), the driver 68 accepts the command message and appends a message sequence number 108 thereto so that the command message has the format 96-1 shown in FIG. 6. Also a Block Check Character (BCC) code 110 is added to the command message. The message sequence number 108 is assigned by the interface driver 68 and is used by the interface driver 68 to correlate or associate a response message with the associated command message. The BCC code 110 is derived from a conventional errorchecking technique and is used to check on the accuracy of transference of data between the interface driver 68 (FIG. 3) and the SPIA board 30. That data which is included in the bracket 112 (FIG. 6) is optional data which is dependent upon the particular command message being sent.

Figure 7:
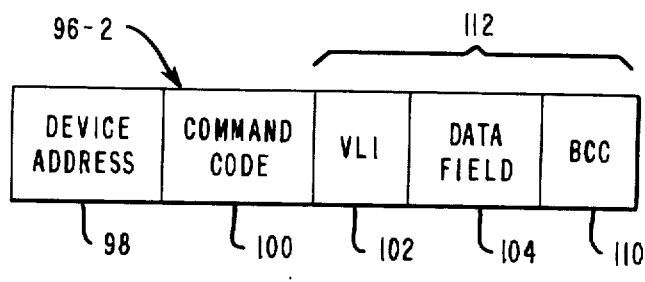
FIG. 7 is a schematic diagram showing the command message format when it is sent to one of the peripherals shown in FIG. 1.

When the command message having the format 96-1 (FIG. 6) is received by the SPIA board 30, the SPIA board 30 strips off the message seuence number 108, resulting in the message format 96-2 shown in FIG. 7. At this time, the SPIA board 30 also generates odd parity for the device address 98 and the command code 100. Assuming correct information, the command message having format 96-2 is sent across the interface bus 24 (FIG. 3) to the addressed peripheral like 18, 20, or 22 for example.

To review, the command message being sent by the interface driver 68 (FIG. 3) is sent to the outbound data latch 84 (FIG. 4) as previously explained. At this time, the status latch 88 is employed to conduct handshaking activities between the interface driver 68 and the SPIA board 30. The command message shown in format 96-1

(FIG. 7) is sent one byte at a time to the SPIA board 30. The SPIP 70 (FIG. 4) has routines stored in its ROM 74 or RAM 76 to determine when the entire command message is transferred to the SPIA board 30. It should be recalled that the VLI 102 gives an indication of the length of the variable data field 104 in bytes. As the command message is transferred, byte by byte, to the SPIA board 30, the message is stored in the RAM 76 of the SPIP 70. Also, when the command message is transferred to the SPIA board 30, the message sequence number 108 (FIG. 6) is stripped from the message format 96-1 and stored in a buffer portion of the RAM 76 associated with the SPIP 70 (FIG. 4); however, this message sequence number 108 in not used by the SPIP 70. After the activities mentioned in this paragraph are performed, the command message shown in format 96-2 is ready to be sent to the peripheral, like 18, 20, or 22 which is addressed.

The serial bus transceiver 92 (FIG. 4) is conventional; electrically the transceiver 92 includes an RS 422A integrated circuit which is used in an RS 485 environment. This interface communication between the transceiver 92 on the SPIA board 30 and the serial bus transceiver 52 (FIG. 2), which is located on peripheral 18, utilize a known standard which is referred to as "Intel Protocol" for microprocessor communications. At the time then the device address 98 (FIG. 7) is placed on the interface bus 24 (FIG. 2), each of the peripherals on the bus 24 will examine the address to determine whether or not that particular peripheral is being addressed. Those peripherals 20 and 22 having different addresses from peripheral 18 in the example being described would resume other activities. Peripheral 18, which is the addressed peripheral in the example described, would receive the command message from the SPIA board 30. Upon receiving the command message, the peripheral 18, through its processor 54 and circuits 56 (FIG. 2), would execute the command message.

Before proceeding further, it appears appropriate to describe in further detail how the command messages 96 are handled in the system 12. As alluded to earlier herein, whe the interface driver 68 assigns the message sequence number 108, the entire message 96-1 (FIG. 6) is also placed in the RAM 34 (FIG. 2) of the terminal 10; the interface driver 68 is software which is processed by the MP 36 of the terminal 10. The interface driver 68 also places the address of the last-named message 96-1 in another portion of the RAM 34 and connects the associated message sequence number with the address of the last-named message 96-1. Notice that the device address (FIG. 5) is part of the message 96-1. As previously stated, when the interface driver 68 sends the command message to the SPIA board 30, the associated SPIP 70 removes the message sequence number 108 resulting in the message format 96-2 shown in FIG. 7. At this time, the SPIP 70 in association with routines located in the ROM 74 or RAM 76 performs a "three message exchange" to transfer the command message to the appropriate peripheral 18, 20 or 22, for example.

In the "three message exchange", the SPIP 70 on the SPIA board 30 sends the "command message" having format 96-2 to a peripheral, like 20, for example, to have a line of printing effected. The peripheral 20 then sends a "reply" to the SPIP 70 indicating that it has received the command message, and thereafter, the SPIP 70 sends an "acknowledgment" back to the peripheral 20. During the time that the "three message exchange" is taking place, the data exchange is effected by a "single thread technique"; in this regard, the SPIP 70 sends a "command message", waits for a "reply" from the peripheral 20, and then sends an "acknowledgment". Even though the SPIP 70 does not send the "message sequence number" to the peripheral 20, the message sequence number is retained in the RAM 76 associated with the SPIP 70. When the "reply" response comes from the peripheral 20 in the example described, the "reply" response and the message sequence number in the RAM 76 (the current one and the only one being worked on) are coupled together by the SPIP 70 and placed in the inbound data latch 86 (FIG. 4) to indicate that the associated command message has been completed. The inbound data latch 86 on the SPIA board 30 may then be queried by the application software (block 58) via the interface driver 68 (FIG. 3). Because the interface driver 68 has stored in RAM 34 the message sequence number and the address for the associated command message (like message format 96-1 in FIG. 6), the driver 68 can correlate the completed command message with the device address 98 for transference to the application software 58 in the terminal 10.

Having described how a command message and a response thereto have been transferred between the terminal 10 and one of its peripherals, like 20, it now appears appropriate to discuss some of the advantages of the system 10.

In this regard, it should be noted that the MS-DOS operating system (block 60 in FIG. 3) operates by the "single thread technique" which is another way of saying that it is "single tasking" and is not "multi-tasking". A conventional peripheral interface driver when coupled to an MS-DOS operating system operates on "single thread technique" in that the MS-DOS operating system and the associated conventional driver are "single tasking" and have to wait, for example, until a printing command to be completed on a printer peripheral is actually completed before going on to another task. It should be recalled that one of the objectives of this invention was to make the system 10 compatible with the MS-DOS operating system, but in addition, an objective was to enhance the system 10, making it adaptable for handling asynchronous or multi-tasking activities. Multitasking is defined to be multiprogramming that provides for the concurrent performance, or interleaved execution, of two or more tasks. This has been accomplished in the system 10, and these multi-tasking activities are transparent to the MS-DOS operating system, (block 60) which is a "single tasking system". The interface driver 68 looks as though it is handling the asynchronous activities, when in reality, it is the SPIA board 30 which handles the asyncnronous activities; however changes in the interface driver 68 enable the SPIA board 30 to handle asynchronous activities, and enable the keyboard manager (block 64 in FIG. 3) and the printer manager (block 66) to be handled through the interface driver 68.

There are advantages of the system 10 which are brought about by the interface driver 68 and the SPIA board 30, even if the application software (block 58) is not written to take advantage of these two named elements. For example, when the application software (block 58), while operating through the MSDOS operating system (block 60), is performing a printing operation in association with the printer peripheral 20, it does so in a "single thread" or "single tasking" technique as previously explained. This means, in effect, that the application software (block 58) must wait until the printing by peripheral 20 is completed. During the time that the application software (block 58) is waiting, the keyboard manager (block 64) may be used to initiate or enter data which is to be printed also by the printer peripheral 20. The keyboard-entered data then may be transferred into the outbound latch 84 of the SPIA board 30 where it waits until the SPIP 70 on the SPIA board 30 decides to send it to the printer peripheral 20 after completion of the prior printing which was initiated by the application software (block 58). Thus, the throughput of the system 10 is increased even if the application software (block 58) is not designed to take advantage of the multi-tasking effected by interface driver 68 and the SPIA board 30.

Several additional advantages of the system 10 are as follows:

1. It permits one low-cost, highly-flexible terminal 10 to control a distributed system of intelligent peripherals 18, 20, and 22, for example.

2. The timings, from terminal 10 (which is positioned on one side of SPIA board 30) are isolated from the timings on the other side of the SPIA board 30.

3. It permits all types of financial peripherals (like 18, 20, and 22) to be interfaced through a single hardware interface (SPIA board 30) instead of having a separate interface for each different peripheral (like 18, 20, and 22).

4. It permits all types of financial peripherals (like 18, 20 and 22) to be interfaced through a single software interface (interface driver 68).

5. It permits secure NBS/DES encryption without having to expose the encoded data and clear text data on the bus 24 (FIG. 1) which is typically an unprotected, in-house link. In other words all the encryption and decryption take place on the SPIA board 30.

Some additional comments about the hardware used in the system 12 appear necessary. In this regard, a printing operation will be described.

At start up of the system 12, the application software 58 (FIG. 3) initiates a reset signal which is passed down to the peripherals, including the printer 20. The printer 20 then relays information back to the application software 58 so that it knows what type of printer the printer 20 is, its memory size, its model number, etc. Based upon this information, the application software 58 decides whether or not there will be a problem with the printer 20. If a problem exists, the application software 58 will initiate an appropriate message to be displayed on the display 38 of the terminal 10.

Assuming that everything is satisfactory in the example described, the application software 58 sends an "Open" command which is listed in Table 1; this readies the printer 20 to receive the next command. Each time these commands are sent from the application software 58, an identification code is also sent to identify the SPIA board 30 (through a hexadecimal code) as the particular board being addressed. In this regard, the peripheral address decoder 82 (FIG. 4) is a circuit which includes two decoders such as Type No. 74LS138 which is available from Texas Instruments Inc., for example.

The next data coming from the application software 58 is the first portion of the command message which is sent to the outbound data latch 84 as previously described. The latch 84 includes the Type No 74LS374 latch which is manufactured by Texas Instruments, Inc., for example. Latch 86 also includes a Type No. 74LS374 latch. This latch 84 is a circuit which creates an interrupt (line 114) when data is present in the latch 84; this interrupt (line 114) is used by the SPIP 70 as an indication that data is waiting in the latch 84 for the SPIP 70 to read.. The interrupt on line 114 is also used by the SPIP 70 to update the appropriate bit of the status latch 88 to indicate to the terminal 10 that data is still present in the outbound data latch 84. When the SPIP 70 reads the data in the outbound data latch 84, the act of reading by the SPIP 70 generates an interrupt, as for example, by changing the output of a flip flop (not shown) associated with the circuitry of data latch 84; this change is also registered in status latch 88. The terminal 10 then knows that the data which it sent to the SPIP 70 has been read by it, and accordingly, the application program 58 can send the next byte of data to the outbound data latch 84 to repeat the process until the entire message is sent. In this regard, it should be recalled that the variable length indicator VLI (102 in FIG. 5) within a command message 96 gives the length of data to be sent. The SPIP 70 keeps a record of the number of bytes of data it is to receive for the particular command message 96. When all the bytes of data are received by the SPIP 70 and stored in its associated RAM 76 (FIG. 4), the SPIP 70 is ready to transfer the data in example being described.

Before proceeding further with the printing example being described, it is useful to explain one aspect of the interrupts being discussed. In this regard, the particular central processing unit (MP) 36, used in terminal 10 is an 8088 CPU which is manufactured by Intel Corp. Due to the limited number of interrupts available on the interface bus 28, the SPIP 30 was able to use only one interrupt line. As a result, it was necessary to provide a technique for handling an interrupt from the outbound data latch 84 and an interrupt from the inbound data latch 86. The technique use and was to use an interrupt enable circuit (EN. CIR.) 116. The usual interrupt line 118 coming from the outbound data latch 84 is fed into the EN. CIR. 116, and the output 120 is coupled to the interrupt line 122 which goes back to MP 36 of the terminal 10. The terminal 10 knows when it is sending data to the outbound data latch 84, and it enables the EN. CIR. 116 so that it can pass the interrupt on line 120 to the line 122 when the SPIP 70 reads the data from latch 84. When the terminal 10 is not sending data to the outbound data latch 84, the EN. CIR. 116 is disabled so that any interrupt on line 122 comes in fact from the inbound data latch 86.

Assume that all the data to be printed, in the example being described, is loaded into the RAM 76 by the process described. The SPIP 70 recognizes the device address 98 in the command message 96 and prepares to send the data to the printer 20. In the embodiment described, the SPIP 70 is, in essence, a microcomputer on a chip, being Type #7041 which is manufactured by Texas Instruments, Inc. Type #7041 has a Universal Asynchronous Receiver Transmitter (UART) on the chip itself. The UART 124 associated with the SPIP 70 is shown in FIG. 4. An important point to emphasize here is that the UART 124 is on the chip itself so that communication between the UART 124 and the CPU or MP 72 is internal to the chip itself. The output of the UART 124 passes to the serial bus transceiver 92 (Type #75176 which is manufactured by Texas Instruments, Inc.) which converts the binary signals from the UART 124 to the appropriate wave shapes for serial transmission over the interface bus 24 to the printer 20.

The printer 20 (FIG. 2) includes the serial bus transceiver 52-1 which is identical to transceiver 92 (FIG. 4) already discussed. In the embodiment described, the serial bus secondary and peripheral driver processor 54-1 also includes a microcomputer on a chip, being Type #7041 which is identical to that used for SPIP 70. The processor 54-1 also includes a UART (not shown) which is identical to UART 124 shown in FIG. 4 to provide for the receiving of data which is then forwarded to the peripheral dependent circuits 56-1 which perform th actual printing.

What is claimed is:

1. A system comprising:
    a plurality of peripherals;
    a personal computer having an application to be run, an interface bus for receiving adapter boards, and an adapter board operatively coupled to said interface bus; and
    a serial communication link for coupling said plurality of peripherals with said adapter board;
    said adapter board comprising:
    processing means for coupling said serial communication link with said personal computer to transfer data between said personal computer and said plurality of peripherals;
    said processing means including:
    a microcomputer on a chip having a UART thereon;
    a serial bus transceiver which is coupled to said serial communication link and said UART; and
    latch means for receiving data to be transferred in accordance with said application between said personal computer and said microcomputer;
    each of said peripherals having a serial bus transceiver to couple the associated peripheral with said serial communication link;
    said data which is transferred being in a format of command messages coming from said application and responses coming from said plurality of peripherals;
    said personal computer including a driver for interfacing said application and said adapter board via said interface bus;
    said driver having means for assigning sequence numbers to said command messages to provide a correlation between said command messages and their associated said responses from said plurality of peripherals;
    said processing means including an encryption means located on said adapter board for encrypting and decrypting said data in response to said application;
    each said command message including a device address to address said plurality of peripherals and said encryption means so as to enable said encryption means located on said adapter board to be addressed as a peripheral; and
    said processing means also including disabling means for disabling said communication link from said adapter board whenever a device address for said encryption means is received by said processing means to keep said encrypting data on said adapter board and to prevent said encrypting data from appearing on said serial communication link.

2. The system as claimed in claim 1 in which said latch means comprises:
    an outbound latch circuit for latching data being transferred from said personal computer to said microcomputer;
    an inbound latch circuit for latching data being transferred from said microcomputer to said personal computer; and
    a status latch circuit for indicating the status of said outbound and inbound latch circuits to said personal computer.

3. The system as claimed in claim 1 in which said personal computer has a processor which runs at an operating speed which is different from the operating speed of said microcomputer on a chip and in which each said peripheral may run at a different operating speed from one another.

4. The system of claim 1 in which the system is a financial system and the application to be run is a financial application.

5. The system of claim 4 in which the plurality of peripherals comprise a printer, a magnetic strip reader, and a keyboard.

* * * * *